Patented July 12, 1932

1,867,035

UNITED STATES PATENT OFFICE

ERNST STOCKER, OF BASEL, SWITZERLAND, ASSIGNOR TO MUNITEX CORPORATION, OF PATERSON, NEW JERSEY, A CORPORATION OF NEW JERSEY

PROCESS FOR MAKING EFFECT THREADS HEAT AND STORAGE PROOF

No Drawing. Application filed April 5, 1928. Serial No. 267,800.

This invention relates to the so-called effect materials or materials immune to certain dyestuffs including substantive, vat, sulphur and the like. More particularly it relates to a process for rendering these materials heat and storageproof.

Vegetable fibers, such as cotton, artificial materials such as threads or filaments produced from viscose or cuprammonium and mercerized cotton, either in the state of loose or spun fibers, threads or fabrics containing them, when treated first with an alkalizing medium and subsequently with an esterifying agent such as the anhydrides of aliphatic or aromatic carbonic acids or the chlorides of carbonic or sulphonic acids, form fibers indifferent or immune to colors or dyes of the type above mentioned. The materials so produced possess an esterified surface and are known as effect or immunized materials. It has been found that these materials, when stored for a rather long period and especially at higher temperatures, change or lose their original color or shade. For instance, it has been observed that white material turns yellowish or brownish and dyed material changes its shade. It has also been found that, when these so-called effect materials are subjected to heat, similar undesirable results are obtained. Furthermore, it has been found that accompanying this change in shade or color the strength of the fiber is greatly reduced, thus rendering the material unsuitable for weaving.

I have found that I can eliminate these undesirable features and disadvantages by treating the so-called effect materials with an acid-binding substance or acid-neutralizing material which has no saponifying effect on the cellulose ester contained in the fiber.

It is, therefore, an object of the invention to produce effect materials or materials immune to substantive, vat, sulphur and other dyestuffs substantially heat and storageproof.

It is a further object of this invention to treat the so-called effect materials with an acid-binding substance which has no saponifying effect on the cellulose ester contained in the fiber.

A specific object of this invention is to subject the so-called effect materials, after the immunization treatment and while still wet, to treatment in a solution of an acid-binding substance which has no saponifying effect on the cellulose ester contained in the fiber.

Further objects will appear from the hereinafter following description and appended claims.

As pointed out above, I have found that the so-called effect materials may be rendered substantially heat and storageproof by subjecting the said materials to an after treatment with an acid-binding or neutralizing substance which has no saponifying effect on the cellulose ester contained in the fiber. The treatment consists in soaking or otherwise thoroughly wetting at ordinary or higher temperatures the materials in a solution of one of the hereinafter mentioned substances in a suitable solvent. The excess solution is then removed by whizzing and the materials subsequently dried.

The invention may be best understood from the following specific examples:

*Example I.*—Vegetable fibers, such as cotton, which have been immunized against substantive, vat, sulphur and other dyestuffs by treatment with an alkalizing medium and para-toluol-sulphochloride are treated while still wet for thirty minutes with an aqueous solution of urea at ordinary temperatures. The cottom, after this treatment, is whizzed and dried in the usual manner.

*Example II.*—Viscose silk which has been rendered immune to substantive, vat, sulphur and other dyes or colors by treatment with an alkalizing medium and para-toluol-sulphochloride is subjected while still wet to 2% aqueous solution of thiourea. Preferably, this treatment is continued for thirty minutes at a temperature of 80° C. At the end of this period the material is centrifuged and dried in the usual manner.

In the above specific examples I have set forth urea and thiourea as the acid-binding or neutralizing substances which I may use in my process. Instead of these specific substances I may, however, use any compound capable of neutralizing acids and having no saponifying effect on the cellulose ester contained in the fibers such as borax, ammonium carbonate, acidamides, asymmetric dimethyldiphenylurea, asymmetric diethyldiphenylurea, methylolurea, hydroxylamine or phenylhydrazine.

In the examples above given the solvent for the acid-binding materials is water. Any other solvent for the acid-binding material may be used, provided it does not attack the fibers treated. The concentration of the solution may vary from a very dilute solution to saturated solution.

Effect materials including threads or immunized fibers produced from cuprammonium cellulose and mercerized cotton in the loose or spun state or fabrics containing them may also be rendered heat and storageproof by the after treatment above described.

The fibers of the materials treated by the above described method do not change their color or shade when stored for any great length of time or when subjected to heat. This treatment does not destroy the immunized characteristic of the fibers nor does it in any way affect the strength of the fibers.

The invention is not restricted to the precise details above set forth, as it will be evident that modifications may be made without departing from the nature of the invention.

I claim:

1. A process for making effect materials substantially heat and storageproof which comprises treating said materials with an acid-binding substance which has no saponifying effect on the cellulose ester in the fibers.

2. A process of making effect materials substantially heat and storageproof which comprises treating said materials with a solution of an acid-binding substance having no saponifying effect on the cellulose ester contained in the fibers.

3. A process of making effect materials substantially heat and storageproof which comprises treating said materials with an aqueous solution of an acid-binding substance having no saponifying effect on the cellulose ester contained in the fibers.

4. A process of making effect threads produced from viscose substantially heat and storageproof which comprises subjecting said threads to a solution of an acid-binding substance having no saponifying effect on the cellulose ester contained in the fibers.

5. A process of making effect threads produced from viscose substantially heat and storageproof which comprises subjecting said threads to an aqueous solution of an acid-binding substance having no saponifying effect on the cellulose ester contained in the fibers.

6. A process of making effect threads produced from viscose substantially heat and storageproof which comprises subjecting said threads to a solution of a urea derivative.

7. A process of making effect threads produced from viscose substantially heat and storageproof which comprises subjecting said threads to a solution of thiourea.

8. A process of making effect threads produced from viscose substantially heat and storageproof which comprises subjecting said threads to a 2% solution of thiourea.

9. A process of making effect threads produced from viscose substantially heat and storageproof which comprises subjecting said threads to a 2% solution of thiourea at 80° C.

10. A process of treating fibers produced from viscose which comprises immunizing said fibers to make them indifferent to substantive and other dyes, and while still wet, treating said fibers with solution containing an acid-binding substance which has no saponifying effect on the cellulose ester in the fiber.

11. A process of treating fibers produced from viscose which comprises immunizing said fibers to make them indifferent to substantive and other dyes and colors, and while still wet, subjecting said treated fibers to an aqueous solution of thiourea.

12. A process of treating materials produced from viscose which comprises immunizing said materials to make them indifferent to substantive and other dyes and while still wet subjecting said treated materials to a solution containing a compound having the formula

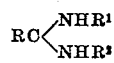

wherein R may represent O or S and $R^1$ and $R^2$ may designate H, an aliphatic or aromatic radical.

13. A process of making effect materials substantially heat and storageproof which comprises subjecting said material to a solution containing a compound having the formula

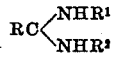

wherein R may represent O or S and $R^1$ and $R^2$ may designate H, an aliphatic or aromatic radical.

14. A process of making effect materials substantially heat and storageproof which comprises subjecting said materials to a solution containing urea.

15. A process of making effect materials substantially heat and storageproof which comprises subjecting said materials to a solution containing thiourea.

16. A process of making effect materials substantially heat and storageproof which comprises subjecting said materials to an aqueous solution containing urea.

17. A process of making effect materials substantially heat and storageproof which comprises subjecting said materials to an aqueous solution containing thiourea.

18. A process which comprises immunizing cellulosic materials to make them indifferent to substantive and other dyestuffs and treating said materials with an acid-binding substance which has no saponifying effect on the cellulose ester in the fibers.

19. A process which comprises immunizing cellulosic materials to make them indifferent to substantive and other dyestuffs and treating said materials with a solution containing a compound having the formula

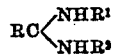

wherein R may represent O or S and $R^1$ and $R^2$ may designate H, an aliphatic or aromatic radical.

20. A process which comprises immunizing cellulosic materials to make them indifferent to substantive and other dyestuffs and treating said materials with a solution containing urea.

21. A process which comprises immunizing cellulosic materials to make them indifferent to substantive and other dyestuffs and treating said materials with a solution containing thiourea.

In testimony whereof, I have affixed my signature.

ERNST STOCKER.